(12) United States Patent
Tsuchiya et al.

(10) Patent No.: US 12,263,929 B2
(45) Date of Patent: Apr. 1, 2025

(54) WATERCRAFT MANEUVERING SYSTEM, AND WATERCRAFT INCLUDING THE SAME

(71) Applicant: YAMAHA HATSUDOKI KABUSHIKI KAISHA, Iwata (JP)

(72) Inventors: Toshiya Tsuchiya, Shizuoka (JP); Kento Sakurada, Shizuoka (JP)

(73) Assignee: YAMAHA HATSUDOKI KABUSHIKI KAISHA, Shizouka (JP)

( * ) Notice: Subject to any disclaimer, the term of this patent is extended or adjusted under 35 U.S.C. 154(b) by 155 days.

(21) Appl. No.: 18/092,494

(22) Filed: Jan. 3, 2023

(65) Prior Publication Data

US 2023/0219677 A1 Jul. 13, 2023

(30) Foreign Application Priority Data

Jan. 13, 2022 (JP) ................. 2022-003925

(51) Int. Cl.
*B63H 21/21* (2006.01)
*B63H 20/12* (2006.01)
*G05D 1/00* (2024.01)

(52) U.S. Cl.
CPC .......... *B63H 21/213* (2013.01); *B63H 20/12* (2013.01); *G05D 1/0206* (2013.01); *B63H 2021/216* (2013.01)

(58) Field of Classification Search
None
See application file for complete search history.

(56) References Cited

U.S. PATENT DOCUMENTS

| 5,741,166 | A  | * | 4/1998 | Newman ............... G05G 11/00 440/84 |
| 6,273,771 | B1 | * | 8/2001 | Buckley ................. G08G 3/02 114/144 RE |
| 6,280,269 | B1 | * | 8/2001 | Gaynor ............... B63H 21/213 440/86 |

(Continued)

FOREIGN PATENT DOCUMENTS

| EP | 2256029 A2 | 12/2010 |
| JP | 2015-67055 A | 4/2015 |

(Continued)

OTHER PUBLICATIONS

Changing Helm station—method?, YBW Forum, available @https://forums.ybw.com/threads/changing-helm-station-method.49336/ last accessed Sep. 7, 2024 (Year: 2004).*

(Continued)

*Primary Examiner* — Daniel L Greene
(74) *Attorney, Agent, or Firm* — Keating & Bennett, LLP

(57) ABSTRACT

A watercraft maneuvering system includes watercraft maneuvering stations to steer and adjust a propulsive force of a watercraft and including a main station including a steering wheel to steer the watercraft and an acceleration lever to adjust the propulsive force, and a substation spaced apart from the main station and including a joystick to both steer the watercraft and adjust the propulsive force. By operating a joystick button provided in the substation, an operative station may be switched from the main station to the substation. At the same time, a control mode may be switched to a joystick mode.

12 Claims, 8 Drawing Sheets

(56) References Cited

U.S. PATENT DOCUMENTS

| | | | | |
|---|---|---|---|---|
| 7,467,595 | B1* | 12/2008 | Lanyi | B63H 25/02 |
| | | | | 114/144 R |
| 7,883,383 | B2* | 2/2011 | Larsson | G05D 1/0206 |
| | | | | 440/1 |
| 10,082,788 | B1* | 9/2018 | Dengel | B63H 25/02 |
| 2007/0270055 | A1 | 11/2007 | Ito et al. | |
| 2008/0133094 | A1* | 6/2008 | Stanek | E02F 9/2041 |
| | | | | 37/468 |
| 2008/0269970 | A1 | 10/2008 | Yamada | |
| 2010/0138083 | A1* | 6/2010 | Kaji | B63H 25/02 |
| | | | | 701/21 |
| 2015/0089434 | A1 | 3/2015 | Akuzawa | |
| 2016/0096611 | A1* | 4/2016 | Suzuki | G05D 1/0206 |
| | | | | 701/2 |
| 2016/0230688 | A1 | 8/2016 | Nakanishi et al. | |
| 2018/0057132 | A1* | 3/2018 | Ward | B63H 21/213 |
| 2019/0061900 | A1* | 2/2019 | Hayashi | B63H 21/21 |
| 2019/0118922 | A1* | 4/2019 | McGinley | B63H 25/42 |

FOREIGN PATENT DOCUMENTS

| | | |
|---|---|---|
| JP | 2017-56757 A | 3/2017 |
| JP | 2017-136932 A | 8/2017 |
| JP | 6563753 B2 | 8/2019 |
| WO | 2010039952 A1 | 4/2010 |

OTHER PUBLICATIONS

Extended European Search Report in EP23150698.1, mailed Jun. 13, 2023, 9 pages.

"Kongsberg cJoy WT (cWing) Remote Wing Terminal, Operator Manual, Release 7.0", Kongsberg Maritime AS, Aug. 31, 2007, 38 pages.

Office Communication issued in corresponding European Patent Application No. 23150698.1, mailed on Feb. 6, 2025, 7 pages.

\* cited by examiner

FIG. 6

| Current station | Current mode | Action | Switching destination station | |
|---|---|---|---|---|
| | | | Substation | Main station |
| | | | Joystick button | Station changing button |
| Main station | Ordinary mode | | To be switched to substation | |
| | Joystick mode | | To be switched to substation | |
| | Position/azimuth holding system | | To be switched to substation | |
| | Course holding system | | Not to be switched | |
| Substation | Ordinary mode | | | To be switched to main station |
| | Joystick mode | | | To be switched to main station |
| | Position/azimuth holding system | | | To be switched to main station |

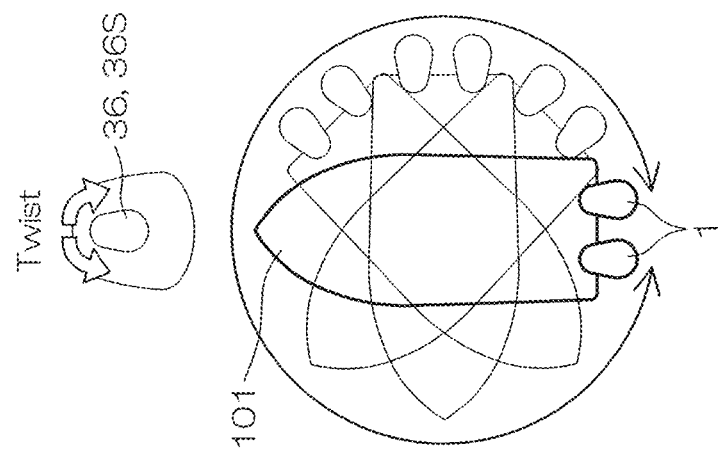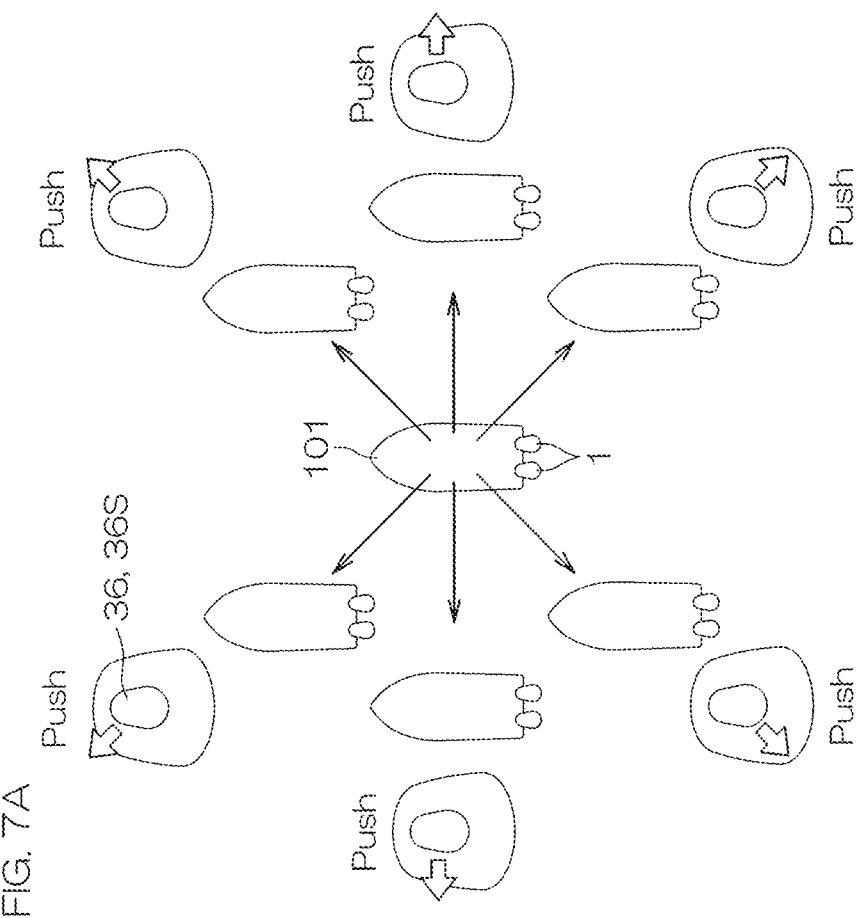

WATERCRAFT MANEUVERING SYSTEM, AND WATERCRAFT INCLUDING THE SAME

CROSS REFERENCE TO RELATED APPLICATIONS

This application claims the benefit of priority to Japanese Patent Application No. 2022-003925 filed on Jan. 13, 2022. The entire contents of this application are hereby incorporated herein by reference.

BACKGROUND OF THE INVENTION

1. Field of the Invention

The present invention relates to a watercraft maneuvering system, and a watercraft including the watercraft maneuvering system.

2. Description of the Related Art

An operation element to be operated by a user is generally provided in a watercraft maneuvering station of a watercraft. Typical examples of the operation element include a steering wheel and an acceleration lever. The user operates the steering wheel to change the course of the watercraft, and operates the acceleration lever to adjust the propulsive force of the watercraft. As disclosed in JP 2017-56757 A1, a joystick is sometimes additionally provided as an operation element in the watercraft maneuvering station. The user operates the joystick to adjust the course and the propulsive force of the watercraft. The watercraft maneuvering operation with the use of the joystick is suitable typically to finely adjust the position and the azimuth of the watercraft during docking, undocking, and berthing.

As disclosed in US 2015/0089434 A1, a plurality of watercraft maneuvering stations are provided on a single watercraft in some cases. The watercraft maneuvering stations generally include the same types of operation elements for the watercraft maneuvering. The watercraft maneuvering stations each include at least a steering wheel and an acceleration lever.

SUMMARY OF THE INVENTION

The inventor of preferred embodiments of the present invention described and claimed in the present application conducted an extensive study and research regarding a watercraft maneuvering system, such as the one described above, and in doing so, discovered and first recognized new unique challenges and previously unrecognized possibilities for improvements as described in greater detail below.

The watercraft maneuvering station including the steering wheel and the acceleration lever occupies a substantial space on the watercraft. Therefore, the watercraft is required to have a relatively large scale for the provision of the plurality of watercraft maneuvering stations. On the other hand, it will be convenient if the user is able to perform the watercraft maneuvering operation at a plurality of different sites even on a smaller watercraft. When the user wants to change the position and the azimuth of the watercraft after reaching a fishing spot and starting fishing on the deck spaced apart from the watercraft maneuvering station, for example, a distance between the deck and the watercraft maneuvering station and time required to move between the deck and the watercraft maneuvering station may be desirably shorter for convenience. Even if the plurality of watercraft maneuvering stations can be provided on the relatively large watercraft, it may be desirable, for the same reason, to provide an additional watercraft maneuvering station at a different position on the watercraft for greater convenience. Of course, even a relatively large watercraft also has space limitations.

Preferred embodiments of the present invention provide watercraft maneuvering systems each including watercraft maneuvering stations which are able to be installed in a smaller space, and watercraft including such watercraft maneuvering systems.

In order to overcome the previously unrecognized and unsolved challenges described above, a preferred embodiment of the present invention provides a watercraft maneuvering system including a plurality of watercraft maneuvering stations to steer and adjust a propulsive force of a watercraft. The watercraft maneuvering stations include a main station including a steering wheel to steer the watercraft and an acceleration lever to adjust the propulsive force of the watercraft, and a substation spaced apart from the main station and including a joystick to both steer and adjust the propulsive force of the watercraft.

With this arrangement, the substation is provided apart from the main station including the steering wheel and the acceleration lever. The substation includes the joystick to both steer and adjust the propulsive force of the watercraft and, therefore, is able to be provided in a smaller space on the watercraft as compared with the main station. Therefore, the substation is able to be provided in addition to the main station on a relatively small watercraft. Further, the watercraft maneuvering station is able to be additionally provided on a relatively large watercraft without taking up much space on the watercraft. Thus, a more convenient watercraft maneuvering system is provided on the watercraft.

According to a preferred embodiment of the present invention, the watercraft maneuvering system further includes a controller configured or programmed to perform a station management operation to select only one of the watercraft maneuvering stations as an operative station in which an operation to steer and adjust the propulsive force of the watercraft is enabled. The substation includes a joystick button operable by a user in order to enable an operation input with the joystick. The controller is configured or programmed to select the substation as the operative station in response to the operation of the joystick button.

With this arrangement, the substation is selected as the operative station by operating the joystick button in the substation such that the joystick operation input is enabled in the substation. Thus, the user is able to switch the operative station from the main station to the substation by a simple operation to enable a watercraft maneuvering operation with the use of the joystick in the substation. Therefore, the user is able to start the watercraft maneuvering operation in the substation without returning to the main station.

According to a preferred embodiment of the present invention, the controller is configured or programmed to determine, in response to the operation of the joystick button, whether a predetermined substation switching condition is satisfied and, if it is determined that the substation switching condition is satisfied, the controller is configures or programmed to select the substation as the operative station. The substation switching condition includes at least one of a condition that the operation state of the current operative station is a propulsive force generation non-commanding state, a condition that the operation state of the joystick of the substation is the propulsive force generation non-commanding state, and a condition that at least one of propulsion systems provided in a watercraft including the watercraft maneuvering system is in a propulsive force operable state.

With this arrangement, the operative station is switched to the substation on condition that the substation switching condition is satisfied. Therefore, the switching of the operative station from the main station to the substation is properly achieved. The watercraft maneuvering system thus provided is highly convenient, and allows smooth switching to the substation.

The substation switching condition preferably includes all of the condition that the operation state of the current operative station is the propulsive force generation non-commanding state, the condition that the operation state of the joystick of the substation is the propulsive force generation non-commanding state, and the condition that at least one of the propulsion systems provided in the watercraft including the watercraft maneuvering system is in the propulsive force operable state.

Particularly, when the condition that the at least one of the propulsion systems provided in the watercraft including the watercraft maneuvering system is in the propulsive force operable state is defined as the substation switching condition, the operative station is switched to the substation in a propulsive force available state. Therefore, the user is able to perform the watercraft maneuvering operation using the propulsive force by operating the joystick in the substation.

In a preferred embodiment of the present invention, the main station includes a station changing button operable by the user in order to enable the watercraft maneuvering operation in the main station. The controller is configured or programmed to determine, in response to the operation of the station changing button, whether a predetermined main station switching condition is satisfied and, if it is determined that the main station switching condition is satisfied, the controller is configured or programed to select the main station as the operative station. The main station switching condition includes at least one of a condition that the operation state of the current operative station is the propulsive force generation non-commanding state, and a condition that the operation state of the main station as a switching destination is the propulsive force generation non-commanding state.

With this arrangement, the user is able to perform the watercraft maneuvering operation with the use of the steering wheel and the acceleration lever of the main station by operating the station changing button provided in the main station. The operative station is switched to the main station on condition that the main station switching condition is satisfied. The watercraft maneuvering system thus provided is highly convenient, and allows smooth switching to the main station.

The main station switching condition preferably includes both of the condition that the operation state of the current operative station is the propulsive force generation non-commanding state, and the condition that the operation state of the main station as the switching destination is the propulsive force generation non-commanding state.

In a preferred embodiment of the present invention, the controller is configured or programmed to perform a mode management operation to manage a propulsion system control mode. The control mode includes an ordinary mode in which the operation of the joystick is disabled, and a joystick mode in which the operation of the joystick is enabled. The controller sets the control mode to the joystick mode when selecting the substation as the operative station.

Specifically, the ordinary mode in which the operation of the joystick is disabled is a control mode in which the watercraft maneuvering operation is enabled with the use of the steering wheel and the acceleration lever. That is, the controller disables the operation of the joystick, and controls the propulsion systems according to the operation of the steering wheel and the acceleration lever. On the other hand, the joystick mode is a control mode in which the operation of the joystick is enabled.

If an additional operation is required to change the control mode from the ordinary mode to the joystick mode when the operative station is switched to the substation by the operation of the joystick button, a procedure required before the watercraft maneuvering operation is performed with the use of the joystick in the substation is prolonged. When the control mode is changed to the joystick mode simultaneously with the switching of the operative station to the substation in response to the operation of the joystick button, the procedure is shortened. The watercraft maneuvering system is thus even more convenient. Since the joystick is provided alone to both steer and adjust the propulsive force in the substation, the automatic switching of the control mode as described above is practical. Where operation elements (e.g., a steering wheel and an acceleration lever) other than the joystick are provided to steer and adjust the propulsive force in the substation, of course, the automatic switching of the control mode is not necessarily appropriate.

In a preferred embodiment of the present invention, the controller is configured or programmed to perform a mode management operation to manage the propulsion system control mode. The control mode includes an ordinary mode in which the operation of the steering wheel and the acceleration lever is enabled and the operation of the joystick is disabled, and a joystick mode in which the operation of the joystick is enabled. The controller is configured or programmed to set the control mode to the joystick mode when the substation is selected as the operative station, and to set the control mode to the ordinary mode when the main station is selected as the operative station in response to the operation of the station changing button of the main station.

As described above, the control mode is set to the joystick mode simultaneously with the switching of the operative station to the substation in response to the operation of the joystick button such that the procedure is shortened. The watercraft maneuvering system is thus more convenient. On the other hand, the control mode is set to the ordinary mode when the operative station is switched to the main station by operating the station changing button in the main station. Thus, the watercraft maneuvering operation is performed with the use of the steering wheel and the acceleration lever in the main station without the need for an operation to switch to the ordinary mode. The watercraft maneuvering system is thus still more convenient.

Where the joystick is provided in the main station, the user may desire to perform the watercraft maneuvering operation with the use of the joystick without the use of the steering wheel and the acceleration lever after the switching to the main station. In the main station, however, the watercraft maneuvering operation is generally performed with the use of the steering wheel and the acceleration lever, so that it is appropriate to set the ordinary mode as a default control mode. When the control mode is the ordinary mode (default control mode) immediately after the operative station is switched to the main station, the user is able to easily recognize the control mode. Therefore, this arrangement is preferable.

The substation in which only the joystick is provided to both steer and adjust the propulsive force is free from the concern described above. Since the control mode is the joystick mode when the operative station is the substation, the user need not be conscious of the control mode.

In a preferred embodiment of the present invention, the main station further includes a joystick. The joystick mode is a control mode which responds to the operation of either of the joystick of the main station when the main station is the operative station, or the joystick of the substation when the substation is the operative station.

That is, the controller controls the propulsion systems according to the operation of the joystick of the main station if the operative station is the main station in the joystick mode. If the operative station is the substation in the joystick mode, on the other hand, the controller controls the propulsion systems according to the operation of the joystick of the substation.

In a preferred embodiment of the present invention, the joystick mode includes a first joystick mode in which the propulsive forces of the plurality of propulsion systems are used, and a second joystick mode in which the propulsive force of less than all propulsive force operable propulsion systems is used. When the control mode is set to the joystick mode, the controller is configured or programmed to determine whether the propulsion systems are in the propulsive force operable state. If all of the plurality of propulsion systems are in the propulsive force operable state, the controller is configured or programmed to set the control mode to the first joystick mode. If not all of the plurality of propulsion systems are in the propulsive force operable state, the controller is configured or programmed to set the control mode to the second joystick mode.

With this arrangement, it is determined whether or not all of the plurality of propulsion systems in the first joystick mode are in the propulsive force operable state, and the control mode is set to the first joystick mode or the second joystick mode according to the result of the determination. Therefore, the joystick mode is properly selected according to the states of the respective propulsion systems, so that the propulsion systems are properly controlled according to the operation of the joystick.

If not all of the plurality of propulsion systems in the first joystick mode are in the propulsive force operable state but the control mode is set to the first joystick mode, the controller uselessly controls a propulsive force non-operable propulsion system. In addition, the propulsive force non-operable propulsion system cannot respond to a control command from the controller, thus failing to achieve an intended hull behavior. When the control mode is set to the second joystick mode in which the propulsive force of less than all propulsive force operable propulsion systems is used, in contrast, the controller is able to achieve the intended hull behavior according to the operation of the joystick without uselessly performing the control operation.

In a preferred embodiment of the present invention, the first joystick mode is a control mode in which the plurality of propulsion systems are controlled so as to achieve a predetermined hull behavior using the propulsive forces of the plurality of propulsion systems according to a predetermined operation of the joystick. The second joystick mode may be a control mode in which the predetermined hull behavior is disabled.

In a preferred embodiment of the present invention, the predetermined hull behavior includes at least one of a translating behavior to translate the hull substantially without turning the bow of the hull, and a fixed-point bow-turning behavior to turn the bow of the hull substantially without changing the position of the hull.

Another preferred embodiment of the present invention provides a watercraft maneuvering system including a plurality of propulsion systems, a joystick, and a controller configured or programmed to have, as a control mode to control the propulsion systems, a joystick mode in which the propulsion systems are controlled according to the operation of the joystick. The joystick mode includes a first joystick mode in which the propulsive forces of the respective propulsion systems are used, and a second joystick mode in which the propulsive force of less than all propulsive force operable propulsion systems is used. When the control mode is set to the joystick mode, the controller is configured or programmed to determine whether the propulsion systems are in a propulsive force operable state. If all of the propulsion systems are in the propulsive force operable state, the controller is configured or programmed to set the control mode to the first joystick mode. If not all of the propulsion systems are in the propulsive force operable state, the controller is configured or programmed to set the control mode to the second joystick mode.

The first joystick mode may be a control mode in which the plurality of propulsion systems are controlled so as to achieve a predetermined hull behavior essentially using the propulsive forces of the respective propulsion systems according to a predetermined operation of the joystick. The second joystick mode may be a control mode in which the predetermined hull behavior is disabled.

The predetermined hull behavior includes at least one of a translating behavior to translate the hull substantially without turning a bow of the hull, and a fixed-point bow-turning behavior to turn the bow of the hull substantially without changing the position of the hull.

Another preferred embodiment of the present invention provides a watercraft including a hull, and the watercraft maneuvering system having the above-described features provided in the hull.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a diagram showing a station switching rule by way of example.

FIGS. 7A and 7B are diagrams for describing exemplary operations to be performed in a first joystick mode using the propulsive forces of two propulsion systems.

DETAILED DESCRIPTION OF THE PREFERRED EMBODIMENTS

Figure 1:
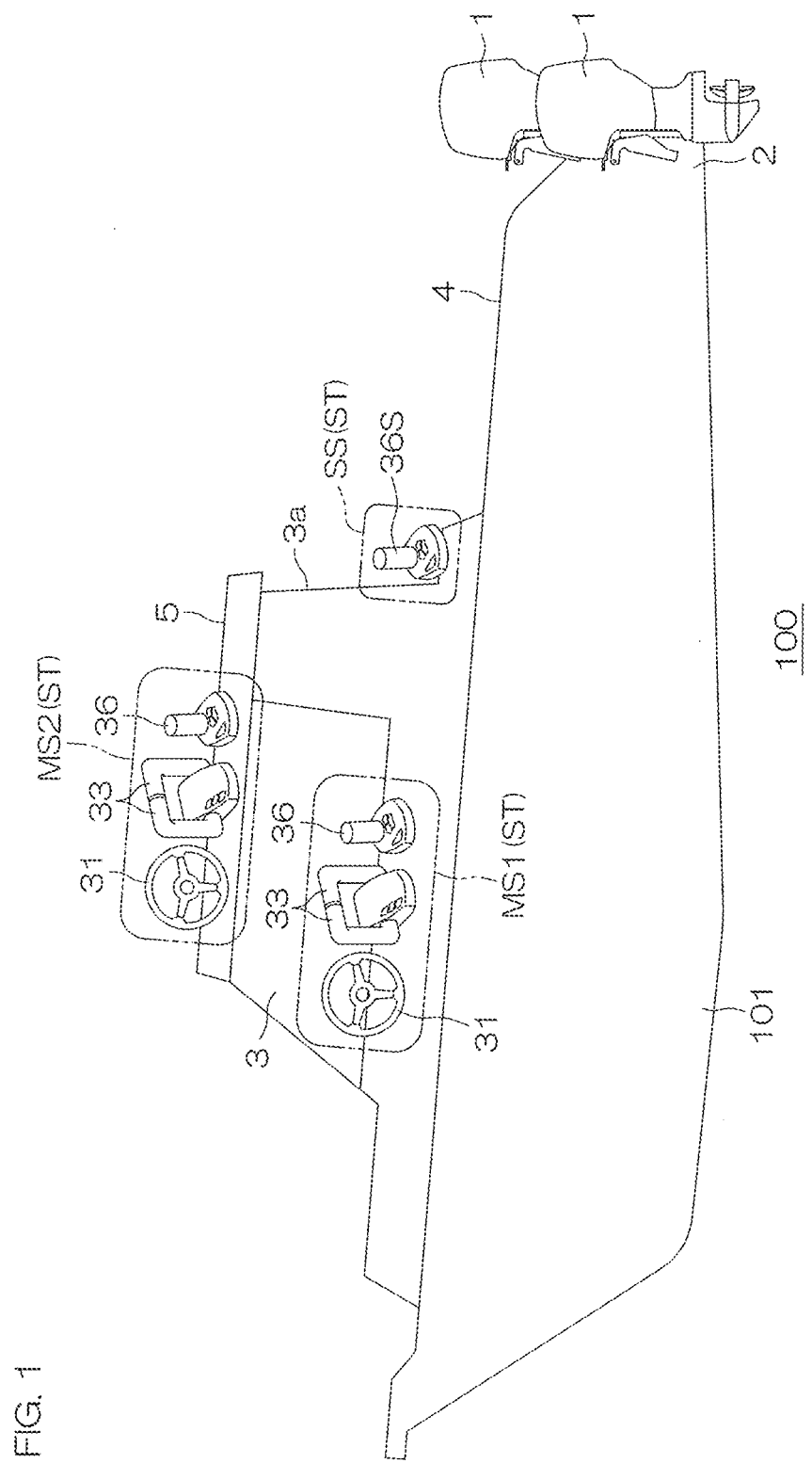
FIG. 1 is a diagram for describing the structure of a watercraft according to a preferred embodiment of the present invention by way of example.

FIG. 1 is a diagram for describing the structure of a watercraft 100 according to a preferred embodiment of the present invention by way of example. The watercraft 100 includes a hull 101 and outboard motors 1 provided as exemplary propulsion systems on the hull 101. In this example, two outboard motors 1 are attached to the stern 2 of the hull 101, and located side by side transversely of the hull 101.

The hull 101 includes a cabin 3 defined by an outer shell to provide a living space, a deck 4 provided behind the cabin 3, and a roof deck 5 provided above the cabin 3. The watercraft 100 includes a plurality of watercraft maneuvering stations ST, and a user is able to perform a watercraft maneuvering operation in any of the watercraft maneuvering stations ST. The watercraft maneuvering stations ST include a first main station MS1 in the cabin 3, a second main station MS2 on the roof deck 5, and a substation SS. The substation SS is spaced apart from the first main station MS1 and the second main station MS2 and, in the present preferred embodiment, is located on the deck 4. The substation SS is located, for example, outside a rear outer shell 3a facing the deck 4, outside of the outer shell defining the cabin 3, i.e., on a side of the outer shell accessible directly from the deck 4.

The first main station MS1 and the second main station MS2 each include a steering wheel 31, acceleration levers 33, and a joystick 36. The steering wheel 31 is an operation element to steer the watercraft 100, and the acceleration levers 33 are operation elements to adjust the propulsive force of the watercraft 100. The joystick 36 is an operation element to both steer and adjust the propulsive force of the watercraft 100. The watercraft maneuvering operation is generally performed by operating the steering wheel 31 and the acceleration levers 33. The watercraft maneuvering operation with the joystick 36 is mainly used to finely adjust the azimuth and/or the position of the watercraft 100 during docking and undocking, and during berthing at a fishing spot. Of course, the watercraft maneuvering operation with the joystick 36 is not limited to that for the adjustment of the azimuth and/or the position of the watercraft 100 during low-speed traveling, but the joystick 36 may be used for the watercraft maneuvering operation during intermediate-speed and high-speed cruising.

The substation SS includes neither the steering wheel 31 nor the acceleration levers 33, but includes a joystick 36S provided alone as an operation element to steer and adjust the propulsive force. The user is able to perform the watercraft maneuvering operation by using the substation SS without returning to the main station MS1 or MS2 after coming out to the deck 4.

Figure 2:
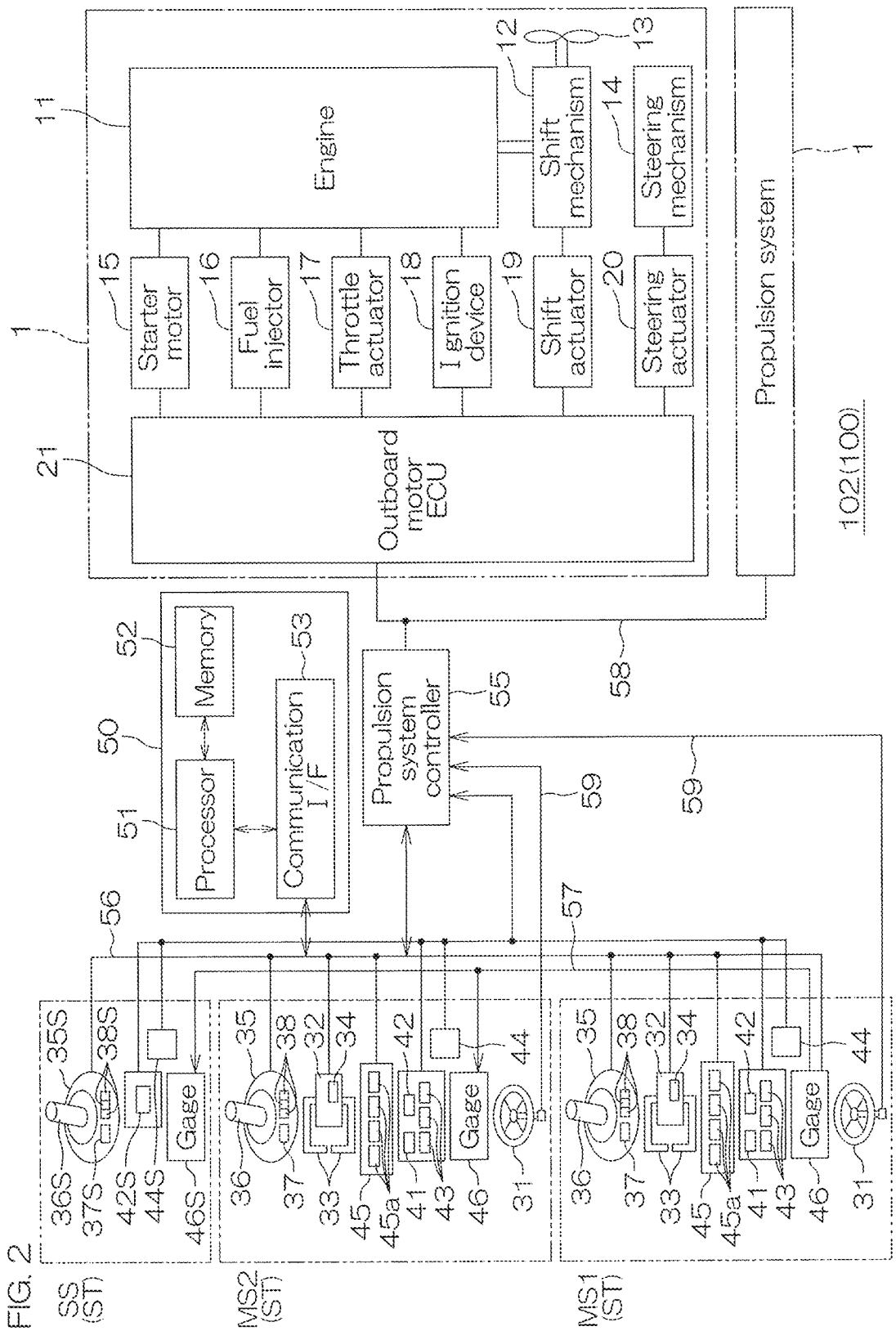
FIG. 2 is a block diagram for describing an exemplary configuration of a watercraft maneuvering system.

FIG. 2 is a block diagram for describing an exemplary configuration of a watercraft maneuvering system 102 provided in the watercraft 100. The watercraft maneuvering system 102 includes the plurality of watercraft maneuvering stations ST, i.e., the first main station MS1, the second main station MS2, and the substation SS. The first main station MS1 and the second main station MS2 have substantially the same configuration. Therefore, these main stations will be referred to simply as "main station MS" if the main stations are not discriminated from each other for the description.

The main station MS includes the steering wheel 31, a remote control unit 32, and a joystick unit 35.

Figure 3:
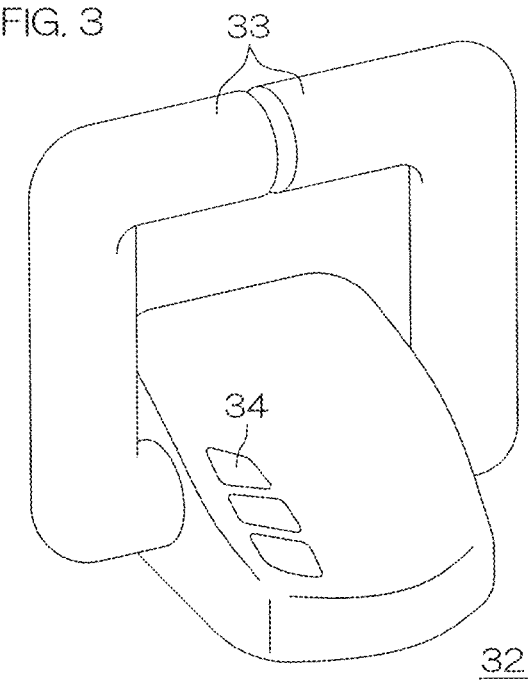
FIG. 3 is a perspective view showing the structure of a remote control unit by way of example.

As shown by an exemplary structure in FIG. 3, the remote control unit 32 includes two acceleration levers 33 respectively corresponding to the two outboard motors 1. Further, the remote control unit 32 includes a station changing button 34. The station changing button 34 is an operation element to be operated by the user when a watercraft maneuvering operation right is transferred to the main station MS from the other watercraft maneuvering stations ST.

Figure 4:
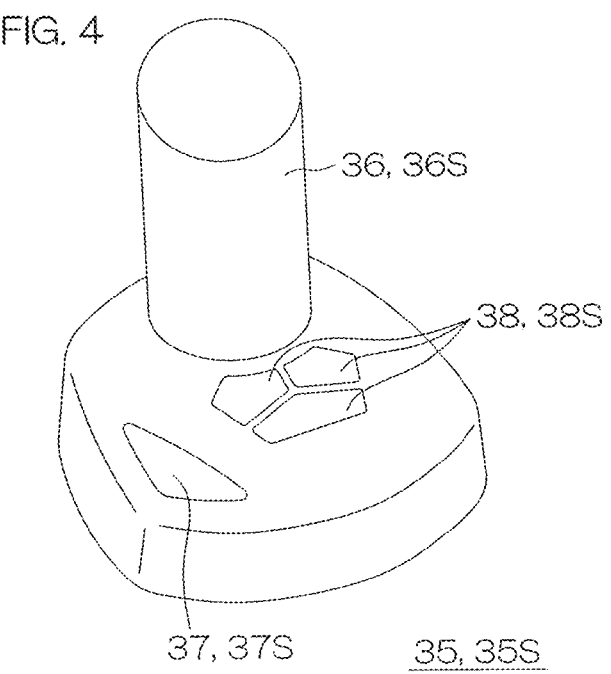
FIG. 4 is a perspective view showing the structure of a joystick unit by way of example.

As shown by an exemplary structure in FIG. 4, the joystick unit 35 includes a joystick 36 that is able to be inclined anteroposteriorly and laterally (i.e., in all 360-degree directions), and turned (twisted) about its axis. In this example, the joystick unit 35 further includes a joystick button 37. The joystick button 37 is an operation element to be operated by the user when a joystick mode using the joystick 36 is to be selected as a control mode (watercraft maneuvering operation mode). In this example, the joystick unit 35 further includes mode setting buttons 38 to be operated by the user in order to select position/azimuth holding system control modes (examples of a control mode for an automatic watercraft maneuvering operation). More specifically, the mode setting buttons 38 include a mode setting button for a fixed point holding mode (Stay Point™) in which the position and the bow azimuth of the watercraft 100 are maintained, a mode setting button for a position holding mode (Fish Point™) in which the position of the watercraft 100 is maintained but the bow azimuth is not maintained, and a mode setting button for an azimuth holding mode (Drift Point™) in which the bow azimuth is maintained but the watercraft position is not maintained.

Referring again to FIG. 2, the main station MS additionally includes a main switch 41, an all-switch 42, separate switches 43, a kill switch 44, an application panel 45, a gage 46, and the like. The main switch 41 is an operation element to be operated by the user in order to turn on and off the watercraft maneuvering system. The all-switch 42 is an operation element to be operated by the user in order to start or stop all of the outboard motors 1. The separate switches 43 are operation elements to be operated by the user to individually start or stop the respective outboard motors 1, and the number of the separate switches 43 corresponds to the number of the outboard motors 1. The kill switch 44 is a switch to which a lanyard is connected at one of its opposite ends with its other end connected to the user in order to stop all of the outboard motors 1 when the user happens to fall overboard. The application panel 45 includes a plurality of switches to start application programs, for example, for the automatic watercraft maneuvering operation. Specifically, the application panel 45 includes mode setting switches 45a to start course holding system (autopilot system) control modes (other examples of the control mode for the automatic watercraft maneuvering operation). Specifically, the course holding system control modes include a bow holding mode (Heading Hold) in which the bow azimuth is maintained during forward traveling, a straight travel holding mode (Course Hold) in which the bow azimuth is maintained and a straight course is maintained during forward traveling, a checkpoint following mode (Track Point) in which a course passing through predetermined checkpoints is followed, and a pattern traveling mode (Pattern Steer) in which a predetermined course pattern is followed. Examples of the course pattern to be followed in the pattern traveling mode include a zig-zag pattern and a spiral pattern. The gage 46 is an instrument which displays the operation states of the respective outboard motors 1.

The substation SS includes a joystick unit 35S. The exemplary structure of the joystick unit 35S is the same as that of the joystick unit 35 provided in the main station MS as shown in FIG. 4. When the joystick unit 35S and its components provided in the substation SS are discriminated from those provided in the main station MS for description, the components in the substation SS will be denoted by reference characters with a suffix "S" added to reference numerals of the components provided in the main station MS.

In the substation SS, no station changing button is provided, but a joystick button 37S doubles as a station switching operation element to transfer the watercraft maneuvering operation right to the substation SS. The joystick button 37S will be described below.

As shown in FIG. 2, the substation SS preferably includes an all-switch 42S, a kill switch 44S, and a gage 46S in addition to the joystick unit 35S. These components have substantially the same configurations as those provided in the main station MS. As described above, the substation SS includes neither the steering wheel nor the acceleration levers. Further, the substation SS may include none of the main switch, the separate switches, and the application panel.

The watercraft maneuvering system 102 includes a watercraft maneuvering controller 50 configured or programmes to control the overall system, and a propulsion system controller 55 which is configured or programmed to generate command signals to be applied to the outboard motors 1. The watercraft maneuvering controller 50 and the propulsion system controller 55 are connected to each other via an onboard network 56 in a communicable manner. The onboard network 56 is typically a CAN (Control Area Network).

The remote control unit 32 and the joystick unit 35 of the main station MS are connected to the onboard network 56. Further, the application panel 45 of the main station MS is also connected to the onboard network 56. The steering wheel 31 of the main station MS is connected to the propulsion system controller 55. Specifically, the operation angle signal of the steering wheel 31 is inputted to the propulsion system controller 55 via a steering signal line 59. Further, the main switch 41 of the main station MS is connected to the propulsion system controller 55 to input a power on/off command signal to the propulsion system controller 55. Further, the all-switch 42, the separate switches 43, and the kill switch 44 of the main station MS are connected to the propulsion system controller 55 to input a propulsion system starting command signal and/or a propulsion system stopping command signal to the propulsion system controller 55.

On the other hand, the joystick unit 35S of the substation SS is connected to the onboard network 56. Further, the all-switch 42S and the kill switch 44S are connected to the propulsion system controller 55 to input a propulsion system starting command signal and/or a propulsion system stopping command signal to the propulsion system controller 55.

The gage 46 of the first main station MS1 is connected to the onboard network 56. The gage 46 of the second main station MS2 and the gage 46S of the substation SS are connected to the gage 46 of the first main station MS1 via a display data line 57.

The propulsion system controller 55 is connected to outboard motor ECUs 21 as controllers of the respective outboard motors 1 (electronic control units, outboard motor controllers) via a control signal line 58. The propulsion system controller 55 is configured or programmed to transmit a steering command, a propulsive force command, and the like to the outboard motors 1. In the present preferred embodiment, the propulsive force command includes a shift command which commands the shift positions of the outboard motors 1, and an output command which commands the outputs (the magnitudes of the propulsive forces) of the outboard motors 1. Further, the propulsion system controller 55 is configured or programmed to receive various detection signals from the outboard motor ECUs 21 of the respective outboard motors 1. The detection signals to be received include signals indicating the states of the respective outboard motors 1, particularly the states of the engines 11 of the respective outboard motors 1, particularly signals required to determine whether or not the engines 11 of the respective outboard motors 1 are driven (in operation). For example, the propulsion system controller 55 may be configured or programmed to receive engine rotation speed signals indicating engine rotation speeds from the respective outboard motors 1. The propulsion system controller 55 is able to determine, based on the engine rotation speed signals, whether or not the engines 11 of the respective outboard motors 1 are being driven, i.e., whether the engines 11 of the respective outboard motors 1 are in a propulsive force operable state or in a propulsive force non-operable state.

The outboard motors 1 may each include an engine outboard motor or an electric outboard motor. In FIG. 2, the engine outboard motors are shown by way of example. The outboard motors 1 each include the outboard motor ECU 21, the engine 11, a shift mechanism 12, a propeller 13, a steering mechanism 14, and the like. Power generated by the engine 11 is transmitted to the propeller 13 via the shift mechanism 12. The steering mechanism 14 laterally changes the direction of a propulsive force generated by the outboard motor 1 to turn the body of the outboard motor 1 leftward and rightward with respect to the hull 101 (see FIG. 1). The shift mechanism 12 selects a shift position from a forward shift position, a reverse shift position, and a neutral shift position. With the forward shift position selected, the propeller 13 is rotated in a normal rotation direction by the transmission of the rotation of the engine 11. With the reverse shift position selected, the propeller 13 is rotated in a reverse rotation direction by the transmission of the rotation of the engine 11. With the neutral shift position selected, the transmission of the power between the engine 11 and the propeller 13 is interrupted.

The outboard motor 1 further includes a starter motor 15, a fuel injector 16, a throttle actuator 17, an ignition device 18, a shift actuator 19, a steering actuator 20, and the like, which are controlled by the outboard motor ECU 21. The starter motor 15 is an electric motor to start the engine 11. The fuel injector 16 injects a fuel to be combusted in the engine 11. The throttle actuator 17 is an electric actuator (typically an electric motor) which actuates the throttle valve of the engine 11. The ignition device 18 ignites a mixed gas in the combustion chamber of the engine 11, and typically includes an ignition plug and an ignition coil. The shift actuator 19 actuates the shift mechanism 12. The steering actuator 20 is a drive source for the steering mechanism 14, and typically includes an electric motor. The steering actuator 20 may include a hydraulic device of an electric pump type.

The watercraft maneuvering controller 50 includes a processor 51 (arithmetic unit), a memory 52, a communication interface 53, and the like. The watercraft maneuvering controller 50 functions as various functional units by executing a program stored in the memory 52. Various data is stored in the memory 52. The onboard network 56 is connected to the communication interface 53. Thus, the watercraft maneuvering controller 50 is able to communicate with the propulsion system controller 55. Further, the watercraft maneuvering controller 50 is able to communicate with the remote control units 32 and the joystick units 35 of the first and second main stations MS1, MS2, and with the joystick unit 35S of the substation SS. The watercraft maneuvering controller 50 is able to communicate with the gage 46 of the first main station MS1 via the onboard network 56 to transmit display data to the gage 46. The display data is further transmitted to the gage 46 of the second main station MS2 and the gage 46S of the substation SS via the display data line 57.

Figure 5:
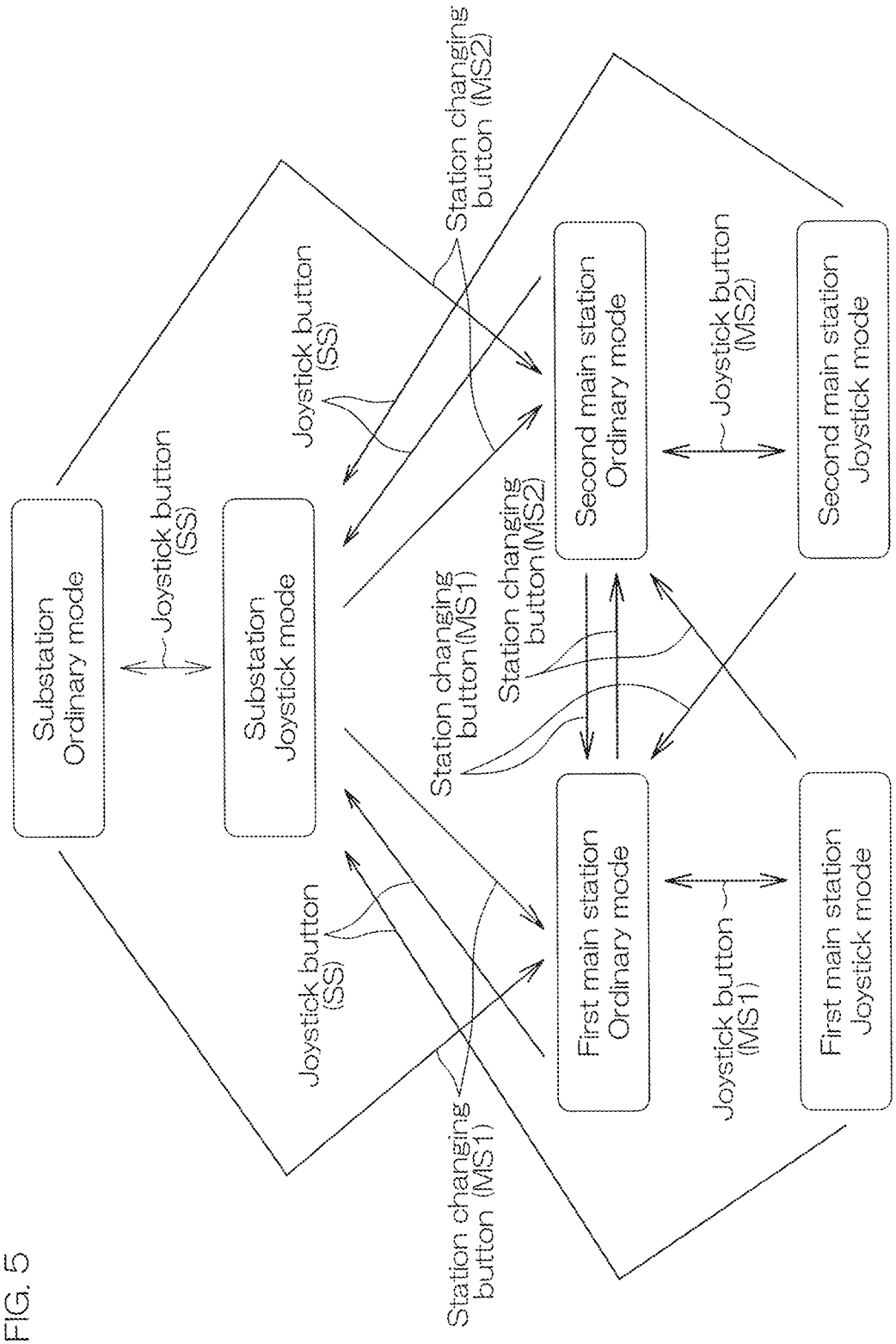
FIG. 5 is a state transition diagram for describing the switching of a station and the switching of a control mode by way of example.

FIG. 5 shows the switching of the operative station and the control mode of the watercraft maneuvering system 102 by way of example. The watercraft maneuvering operation right (operation priority) is possessed by one of the plurality of watercraft maneuvering stations ST provided in the watercraft maneuvering system 102, i.e., the first main station MS1, the second main station MS2, and the substation SS. The watercraft maneuvering station ST having the watercraft maneuvering operation right is herein referred to as the "operative station."

The watercraft maneuvering controller 50 functions to perform a station management operation to select one of the watercraft maneuvering stations ST as the operative station. The watercraft maneuvering controller 50 transmits information of the operative station to the propulsion system controller 55, and shares the information with the propulsion system controller 55. The propulsion system controller 55 enables operation signals applied from the operation elements provided in the operative station for the steering and/or adjustment of the propulsive force, and disables operation signals applied from the operation elements provided in the other watercraft maneuvering stations ST for the steering and/or adjustment of the propulsive force.

The watercraft maneuvering controller 50 functions to perform a mode management operation so as to manage the control mode of the outboard motors 1 (propulsion systems). The watercraft maneuvering system 102 includes a plurality of control modes. Information indicating the control mode (mode information) is shared at least by the watercraft maneuvering controller 50 and the propulsion system controller 55. The plurality of control modes include an ordinary mode and a joystick mode. The ordinary mode is a control mode in which a steering control operation is performed according to an operation signal (operation angle signal) generated by the steering wheel 31 and a propulsive force control operation is performed according to operation signals (operation position signals) of the acceleration levers 33 of the remote control unit 32. In the present preferred embodiment, the ordinary mode is a default control mode of the watercraft maneuvering system 102. The joystick mode is a control mode in which the steering control operation and the propulsive force control operation are performed according to an operation signal of the joystick 36, 36S of the joystick unit 35, 35S. Specifically, the steering control operation is a control operation to be performed so as to cause the outboard motor ECUs 21 to drive the steering actuators 20 according to the steering command applied to the outboard motor ECUs 21 by the propulsion system controller 55. Thus, the bodies of the outboard motors 1 are turned leftward and rightward such that the directions of the propulsive forces with respect to the hull 101 are changed leftward and rightward. Specifically, the propulsive force control operation is a control operation to be performed so as to cause the outboard motor ECUs 21 to drive the shift actuators 19 and the throttle actuators 17 according to the propulsive force command (shift command and output command) applied to the outboard motor ECUs 21 by the propulsion system controller 55. Thus, the shift positions of the outboard motors 1 are each set to the forward shift position, the reverse shift position, or the neutral shift position, and the engine outputs (specifically, the engine rotation speeds) are changed. In the present preferred embodiment, the plurality of control modes include the control modes for the automatic watercraft maneuvering operation in addition to the ordinary mode and the joystick mode.

When the first main station MS1 is the operative station and the control mode is the ordinary mode, the operation of the steering wheel 31 and the acceleration levers 33 of the first main station MS1 is enabled. If the joystick button 37 of the first main station MS1 is pressed in this state, the watercraft maneuvering controller 50 switches the control mode to the joystick mode such that the operation of the steering wheel 31 and the acceleration levers 33 of the first main station MS1 is disabled and, instead, the operation of the joystick 36 of the joystick unit 35 provided in the first main station MS1 is enabled. However, the mode switching from the ordinary mode to the joystick mode is permitted on condition that a predetermined joystick mode switching condition is satisfied. Specifically, the joystick mode switching condition may be a condition that the shift position is the neutral shift position, a condition that the joystick 36 is in a joystick neutral position (in a non-operation state), or a condition that the engine 11 of at least one of the outboard motors 1 (propulsion systems) is in an operation state. If the joystick button 37 of the first main station MS1 is pressed in the joystick mode, the watercraft maneuvering controller 50 switches the control mode to the ordinary mode such that the operation of the joystick 36 of the first main station MS1 is disabled and, instead, the operation of the steering wheel 31 and the acceleration levers 33 provided in the first main station MS1 is enabled. The mode switching from the joystick mode to the ordinary mode is permitted on condition that a predetermined ordinary mode switching condition is satisfied. Specifically, the ordinary mode switching condition may be a condition that the joystick 36 is in the joystick neutral position (in the non-operation state), or a condition that the shift position is the neutral shift position.

If the station changing button 34 of the second main station MS2 is pressed when the first main station MS1 is the operative station and the control mode is the ordinary mode, the watercraft maneuvering controller 50 switches the operative station to the second main station MS2. The control mode is maintained in the ordinary mode. Thus, the operation of the steering wheel 31 and the acceleration levers 33 of the first main station MS1 is disabled and, instead, the operation of the steering wheel 31 and the acceleration levers 33 of the second main station MS2 is enabled. If the joystick button 37 of the second main station MS2 is pressed in this state, the watercraft maneuvering controller 50 switches the control mode to the joystick mode such that the operation of the steering wheel 31 and the acceleration levers 33 of the second main station MS2 is disabled and, instead, the operation of the joystick 36 of the joystick unit 35 provided in the second main station MS2 is enabled. However, the mode switching from the ordinary mode to the joystick mode is permitted on condition that the joystick mode switching condition described above is satisfied. If the joystick button 37 of the second main station MS2 is pressed in the joystick mode, the watercraft maneuvering controller 50 switches the control mode to the ordinary mode such that the operation of the joystick 36 of the second main station MS2 is disabled and, instead, the operation of the steering wheel 31 and the acceleration levers 33 provided in the second main station MS2 is enabled. The mode switching from the joystick mode to the ordinary mode is permitted on condition that the ordinary mode switching condition described above is satisfied. An operation to be performed if the station changing button 34 of the first main station MS1 is pressed when the second main station MS2 is the operative station and the control mode is the ordinary mode is such that the term "first main station MS1" is replaced with the term "second main station MS2" in this paragraph.

If the station changing button 34 of the second main station MS2 is pressed when the first main station MS1 is the operative station and the control mode is the joystick mode, the watercraft maneuvering controller 50 switches the operative station to the second main station MS2. At this time, the watercraft maneuvering controller 50 switches the control mode to the ordinary mode. Therefore, the operation of the joystick 36 of the first main station MS1 is disabled and, instead, the operation of the steering wheel 31 and the acceleration levers 33 of the second main station MS2 is enabled. If the joystick button 37 of the second main station MS2 is pressed in this state, the control mode is switched in the above-described manner. An operation to be performed if the station changing button 34 of the first main station MS1 is pressed when the second main station MS2 is the operative station and the control mode is the joystick mode is such that the term "first main station MS1" is replaced with the term "second main station MS2" in this paragraph.

When the first main station MS1 is the operative station and the control mode is the joystick mode, the watercraft maneuvering controller 50 may switch the control mode from the joystick mode to the ordinary mode in response to the operation of the acceleration levers 33 of the first main station MS1. Similarly, when the second main station MS2 is the operative station and the control mode is the joystick mode, the watercraft maneuvering controller 50 may switch the control mode from the joystick mode to the ordinary mode in response to the operation of the acceleration levers 33 of the second main station MS2.

Next, the switching of the operative station between the main station MS and the substation SS will be described. Since the switching of the operative station between the first main station MS1 and the substation SS and the switching of the operative station between the second main station MS2 and the substation SS are substantially the same, the switching between the main station MS and the substation SS will hereinafter generally be described.

If the joystick button 37S of the substation SS is pressed when the main station MS is the operative station and the control mode is the ordinary mode, the watercraft maneuvering controller 50 switches the operative station from the main station MS to the substation SS. At this time, the watercraft maneuvering controller 50 further switches the control mode from the ordinary mode to the joystick mode. The station switching and the mode switching are permitted on condition that a predetermined substation switching condition is satisfied. That is, if the joystick button 37S of the substation SS is pressed, the watercraft maneuvering controller 50 determines whether the substation switching condition is satisfied. If the substation switching condition is satisfied, the watercraft maneuvering controller 50 switches the operative station to the substation SS, and switches the control mode to the joystick mode. If the substation switching condition is not satisfied, the operative station and the control mode are maintained in the current status.

Specifically, the substation switching condition includes at least one of, and preferably all of the following conditions (1), (2), and (3):

Condition (1)

The operation state of the current operative station is a propulsive force generation non-commanding state.

Condition (2)

The operation state of the joystick 36S of the substation SS is a propulsive force generation non-commanding state.

Condition (3)

At least one of the propulsion systems provided in the watercraft 100 including the watercraft maneuvering system 102 is a propulsive force operable state.

In the ordinary mode, the condition (1) corresponds to a state such that the shift positions commanded by the acceleration levers 33 are each the neutral shift position. The condition (2) corresponds to a state such that the joystick 36S of the substation SS is in the non-operation state, i.e., the joystick 36S is in the joystick neutral position (not inclined in any directions) and in a neutral twist position (not twisted about its axis). In the present preferred embodiment, the condition (3) corresponds to a state such that at least one of the outboard motors 1 is in an engine operation state.

If the joystick button 37S of the substation SS is pressed when the main station MS is the operative station and the control mode is the joystick mode, the watercraft maneuvering controller 50 switches the operative station from the main station MS to the substation SS. At this time, the watercraft maneuvering controller 50 maintains the control mode in the joystick mode. In this case, the switching of the operative station is permitted on condition that the substation switching condition is satisfied. In the joystick mode, the condition (1) corresponds to a state such that the joystick 36 of the main station MS is in the non-operation state, i.e., the joystick 36 is in the joystick neutral position (not inclined in any directions) and in the neutral twist position (not twisted about its axis).

If the operative station is switched from the main station MS to the substation SS, the operation of the operation element for the steering and the propulsive force adjustment in the main station MS is disabled. Specifically, the operation of the steering wheel 31, the acceleration levers 33, and the joystick 36 of the main station MS is disabled. When the operative station is switched to the substation SS, the control mode is switched to the joystick mode. Therefore, the watercraft maneuvering operation is able to be performed with the use of the joystick 36S of the substation SS for the steering and the propulsive force adjustment.

When the operative station is the substation SS, the watercraft maneuvering controller 50 may toggle the control mode between the joystick mode and the ordinary mode in response to the pressing of the joystick button 37S of the substation SS. The mode switching in this case is shown in FIG. 5. When the operative station is the substation SS, the watercraft maneuvering controller 50 may maintain the control mode in the joystick mode.

If the station changing button 34 of the main station MS is pressed when the substation SS is the operative station, the watercraft maneuvering controller 50 switches the operative station from the substation SS to the main station MS. If the control mode is the joystick mode at this time, the watercraft maneuvering controller 50 switches the control mode to the ordinary mode. If the control mode is the ordinary mode, on the other hand, the watercraft maneuvering controller 50 maintains the control mode in the ordinary mode. That is, if the operative station is switched from the substation SS to the main station MS, the control mode is switched to the ordinary mode.

The station switching from the substation SS to the main station MS is permitted on condition that a predetermined main station switching condition is satisfied. That is, if the station changing button 34 of the main station MS is pressed, the watercraft maneuvering controller 50 determines whether or not the main station switching condition is satisfied. If the main station switching condition is satisfied, the watercraft maneuvering controller 50 switches the operative station to the main station MS, and switches the control mode to the ordinary mode. If the main station switching condition is not satisfied, the operative station and the control mode are maintained in the current status.

Specifically, the main station switching condition includes at least one of, and preferably both of the following conditions (A) and (B):

Condition (A)

The operation state of the current operative station is the propulsive force generation non-commanding state.

Condition (B)

The operation state of the main station MS as a switching destination is the propulsive force generation non-commanding state.

It is herein assumed that the current operative station is the substation SS and, therefore, the condition (A) corresponds to a state such that the joystick 36S of the substation SS is in the non-operation state, i.e., the joystick 36S is in the joystick neutral position (not inclined in any directions) and in the neutral twist position (not twisted about its axis). The condition (B) corresponds to a state such that the shift positions commanded by the acceleration levers 33 of the main station MS as the switching destination are each the neutral shift position. Further, the condition (B) may correspond to a state such that the joystick 36 of the main station MS as the switching destination is in the non-operation state, i.e., the joystick 36 is in the joystick neutral position (not inclined in any directions) and in the neutral twist position (not twisted about its axis). In the present preferred embodiment, however, the control mode is the ordinary mode when the operative station is switched to the main station MS and, therefore, the conditions related to the joystick 36 may be omitted.

When the operative station is switched between the first main station MS1 and the second main station MS2, the watercraft maneuvering controller 50 preferably determines whether or not the main station switching condition described above is satisfied. The watercraft maneuvering controller 50 preferably switches the operative station between the first main station MS1 and the second main station MS2 on condition that the main station switching condition is satisfied. In the ordinary mode, in this case, the condition (A) corresponds to a state such that the shift positions commanded by the acceleration levers 33 of the main station MS as a switching origin are each the neutral shift position. In the joystick mode, the condition (A) corresponds to a state such that the joystick 36 of the main station MS as the switching origin is in the non-operation state, i.e., the joystick 36 is in the joystick neutral position (not inclined in any directions) and in the neutral twist position (not twisted about its axis). The condition (B) is the same as described above.

In the present preferred embodiment, even if the joystick button 37 of the joystick unit 35 of the main station MS is pressed, the station switching from the substation SS to the main station MS does not occur. Even if the mode setting button 38 provided in the joystick unit 35 to select the position/azimuth holding system control mode is pressed, the station switching does not occur. That is, the structure for station switching from the substation SS to the main station MS is limited to the station changing button 34. However, this does not mean that the present invention is limited to the arrangement in which the operation element for the station switching is only the station changing button 34.

In the present preferred embodiment, even if the mode setting button 38S provided in the joystick unit 35S of the substation SS to select the position/azimuth holding system control mode is pressed, the station switching from the main station MS to the substation SS does not occur. That is, the structure for station switching from the main station MS to the substation SS is limited to the joystick button 37S. However, this does not mean that the present invention is limited to the arrangement in which the operation element for the station switching is only the joystick button 37S.

FIG. 6 shows an exemplary rule to switch the operative station between the main station MS and the substation SS. When the operative station is the main station MS and the control mode is the ordinary mode or the joystick mode, the switching to the substation SS is achieved in the above-described manner. When the operative station is the substation SS and the control mode is the ordinary mode or the joystick mode, the switching to the main station MS is also achieved in the above-described manner.

As described above, the joystick unit 35, 35S includes the mode setting button 38, 38S to be operated by the user in order to select the position/azimuth holding system control mode (the control mode for the automatic watercraft maneuvering operation). Whether the operative station is the main station MS or the substation SS, therefore, the control mode is able to be set to the position/azimuth holding system control mode. An operative station switching rule to be used in this case is the same as that to be used in the joystick mode in the example of FIG. 6.

As described above, the control mode is able to be set to the course holding system (autopilot system) control mode by operating the application panel 45 provided in the main station MS. In the example of FIG. 6, even if the joystick button 37S is pressed in the substation SS when the operative station is the main station MS and the control mode is set to the course holding system control mode, the switching of the operative station is prohibited. That is, unless an operation to cancel the course holding system control mode is performed in the main station MS, the operative station is not switched to the substation SS.

Whenever the switching of the operative station is permitted based on the station switching rule of FIG. 6, the switching to the main station MS is permitted on condition that the main station switching condition is satisfied. Similarly, the switching to the substation SS is permitted on condition that the substation switching condition is satisfied.

Figure 8:
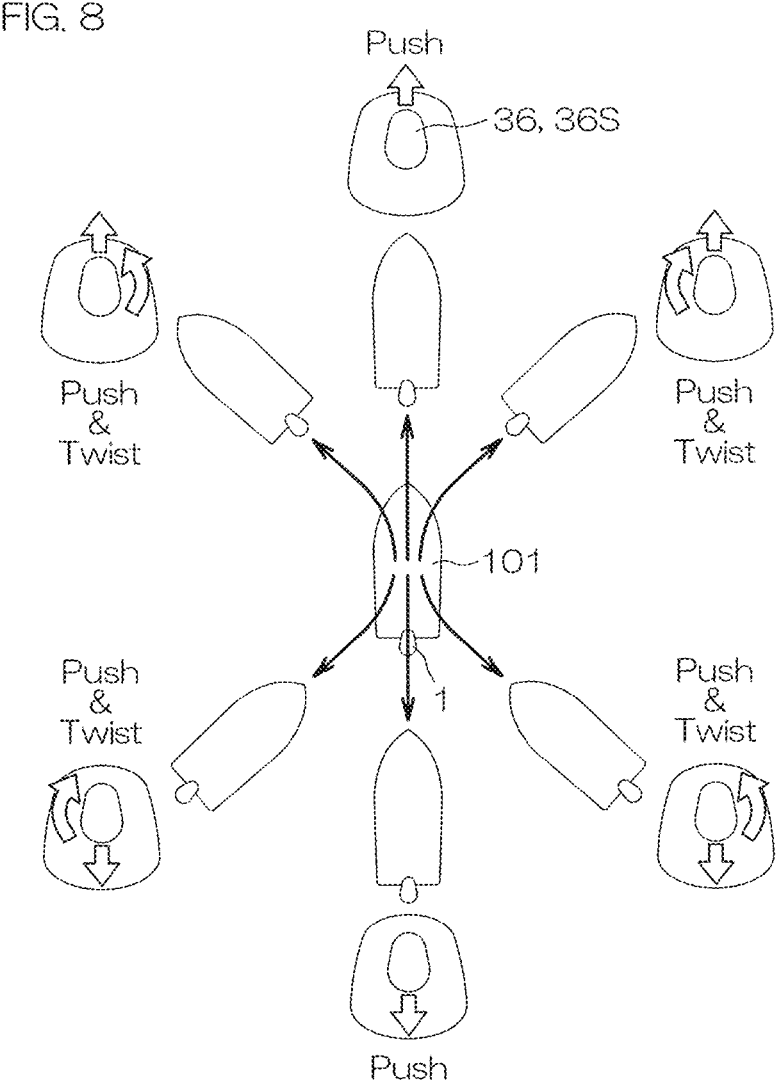
FIG. 8 is a diagram for describing exemplary operations to be performed in a second joystick mode using the propulsive force of a single propulsion system.

FIGS. 7A, 7B, and 8 are diagrams for describing two types of joystick modes, and showing operations of the joystick 36, 36S and behaviors of the hull 101 corresponding to the operations. More specifically, FIGS. 7A and 7B show exemplary operations to be performed in a first joystick mode using the propulsive forces of the two outboard motors 1. FIG. 8 shows exemplary operations to be performed in a second joystick mode using the propulsive force of one of the outboard motors 1.

In the first joystick mode shown in FIGS. 7A and 7B, the watercraft maneuvering controller 50 regards the inclination direction of the joystick 36, 36S as a traveling direction command, and regards the inclination degree of the joystick 36, 36S as a propulsive force magnitude command. Further, the watercraft maneuvering controller 50 regards the twist direction of the joystick 36, 36S about its axis (the twist direction with respect to the joystick neutral position) as a bow turning direction command, and regards the twist degree of the joystick 36, 36S (the twist degree with respect to the joystick neutral position) as a bow turning speed command. Then, the watercraft maneuvering controller 50 inputs a steering command and a propulsive force command to the propulsion system controller 55 to realize the above-described commands. The propulsion system controller 55 transmits the steering command and the propulsive force command to the outboard motor ECUs 21. Thus, the outboard motors 1 are turned to the commanded steering angle, and the shift positions and the engine rotation speeds of the respective outboard motors 1 are controlled to generate the commanded propulsive forces.

When the joystick 36, 36S is inclined without twisting in the first joystick mode, the hull 101 is moved in a direction corresponding to the inclination direction of the joystick 36, 36S with its bow not turned, i.e., with its azimuth maintained. That is, the hull 101 is in a translating behavior. An example of the translating behavior is shown in FIG. 7A. The translating behavior is typically achieved by directing the propulsive forces of the two outboard motors 1 toward the turning center (around the gravity center) of the hull 101 with the shift position of one of the outboard motors 1 set to the forward shift position and with the shift position of the other outboard motor 1 set to the reverse shift position. That is, the hull 101 translates in the direction of the resultant force of the propulsive forces generated by the two outboard motors 1. When the outboard motor 1 in the forward shift position and the outboard motor 1 in the reverse shift position respectively generate propulsive forces having the same magnitude, for example, the hull 101 is able to laterally translate.

When the joystick 36, 36S is twisted without inclination in the first joystick mode, the hull 101 is turned in a direction corresponding to the twisting direction of the joystick 36, 36S with its position kept unchanged. That is, the hull 101 is in a fixed-point bow turning behavior. An example of the fixed-point bow turning behavior is shown in FIG. 7B. The fixed-point bow turning behavior is typically achieved by causing the two outboard motors 1 to generate propulsive forces having the same magnitude with the shift position of one of the outboard motors 1 set in the forward shift position and with the shift position of the other outboard motor 1 set in the reverse shift position and directing the propulsive forces generated by the two outboard motors 1 parallel or substantially parallel to the azimuth of the hull 101.

When the joystick 36, 36S is inclined and twisted in the first joystick mode, a hull behavior is provided such that the bow of the hull 101 is turned in a direction corresponding to the twisting direction of the joystick 36, 36S while being moved in a direction corresponding to the inclination direction of the joystick 36, 36S. For easier watercraft maneuvering operation, however, the position of the hull 101 is generally adjusted through the translating behavior (see FIG. 7A) by inclining the joystick 36, 36S, and the azimuth of the hull 101 is generally adjusted through the fixed-point bow turning behavior (see FIG. 7B) by twisting the joystick 36, 36S.

In the second joystick mode shown in FIG. 8, the propulsive force generated by one of the outboard motors 1 is used. Therefore, it is impossible to provide the translating behavior (see FIG. 7A) and the fixed-point bow turning behavior (see FIG. 7B) which utilize the resultant force of the propulsive forces generated by the outboard motors 1. That is, the second joystick mode is a control mode in which the predetermined hull behaviors (i.e., the translating behavior and the fixed-point bow turning behavior) provided in the first joystick mode are disabled. In the second joystick mode, the watercraft maneuvering controller 50 regards the anteroposterior inclination of the joystick 36, 36S as the propulsive force command (shift command and output command), and ignores the lateral inclination of the joystick 36, 36S. That is, when the joystick 36, 36S is inclined, only the anteroposterior component of the inclination direction of the joystick 36, 36S serves as an effective input, and the anteroposterior component is regarded as the propulsive force command. More specifically, when the value of the anteroposterior component corresponds to the forward inclination, the anteroposterior component is regarded as a forward shift command. When the value of the anteroposterior component corresponds to the reverse inclination, the anteroposterior component is regarded as a reverse shift command. Then, the magnitude of the anteroposterior component is regarded as a command (output command) related to the magnitude of the propulsive force. The propulsive force command thus regarded is inputted from the watercraft maneuvering controller 50 to the propulsion system controller 55. In the second joystick mode, on the other hand, the watercraft maneuvering controller 50 regards the twisting of the joystick 36, 36S about the axis as a steering command. That is, the watercraft maneuvering controller 50 inputs the steering command to the propulsion system controller 55 according to the twist direction and the twist degree of the joystick 36, 36S about the axis. The propulsion system controller 55 transmits the steering command and the propulsive force command to the outboard motor ECU 21. Thus, the outboard motor 1 is turned to a steering angle according to the steering command, and the shift position and the engine rotation speed of the outboard motor 1 are controlled to generate a propulsive force according to the propulsive force command.

Figure 9:
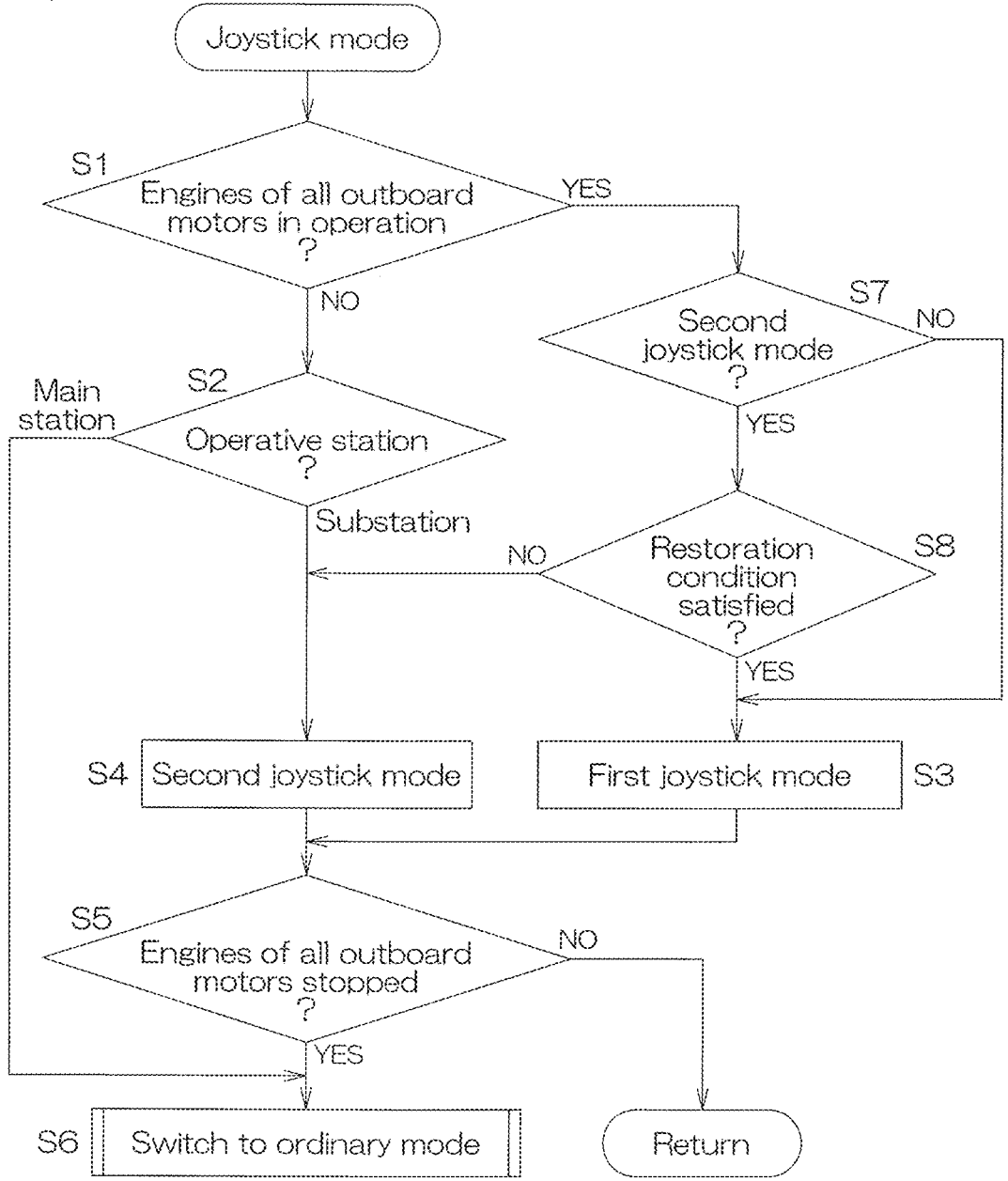
FIG. 9 is a flowchart for describing an exemplary process to be performed by a watercraft maneuvering controller in the joystick mode.

FIG. 9 is a flowchart for describing an exemplary process to be performed by the watercraft maneuvering controller 50 in the joystick mode. In the joystick mode, the watercraft maneuvering controller 50 determines whether or not all of the outboard motors 1 with their propulsive forces to be used in the first joystick mode are in the propulsive force operable state (Step S1). Specifically, the propulsive force operable state is such that the engines 11 of the outboard motors 1 are in the operation state. If the engines 11 are off, it is determined that the outboard motors 1 are in the propulsive force non-operable state.

If all of the outboard motors 1 with their propulsive forces to be used in the first joystick mode are in the propulsive force operable state (YES in Step S1), the watercraft maneuvering controller 50 confirms that the current control mode is not the second joystick mode (NO in Step S7), and sets the control mode to the first joystick mode (Step S3). Therefore, the hull behavior described above with reference to FIGS. 7A and 7B is provided by the operation of the joystick 36, 36S.

If not all of the outboard motors 1 with their propulsive forces to be used in the first joystick mode are in the propulsive force operable state (NO in Step S1), on the other hand, the watercraft maneuvering controller 50 determines whether the operative station is the main station MS or the substation SS (Step S2). If the operative station is the main station MS, the watercraft maneuvering controller 50 cancels the joystick mode, and switches the control mode to the ordinary mode (Step S6). If the operative station is the substation SS, the watercraft maneuvering controller 50 sets the control mode to the second joystick mode (Step S4). Thus, the propulsive force of at least one of the outboard motors 1 in the propulsive force operable state is used by the operation of the joystick 36S to provide the hull behavior described above with reference to FIG. 8.

If the operative station is the main station MS, the joystick mode is canceled, and the control mode is switched to the ordinary mode (Step S6). Thus, the watercraft maneuvering operation is performed by operating the steering wheel 31 and the acceleration levers 33. On the other hand, the substation SS includes only the joystick 36S as the operation element for the steering and the propulsive force adjustment. Therefore, even if the control mode is switched to the ordinary mode when the operative station is the substation SS, the corresponding operation elements (the steering wheel and the acceleration levers) are absent. With the second joystick mode thus selected, the watercraft maneuvering operation with the use of the joystick 36S is enabled (Step S4).

A proper informing device is preferably provided to inform the user of which of the first joystick mode and the second joystick mode is selected in the joystick mode. Thus, the user is able to operate the joystick 36, 36S while understanding a relationship between the operation of the joystick 36, 36S and a hull behavior expected from the operation of the joystick 36, 36S. The informing device may be the gage 46, 46S, or may be some other display device. Further, a LED lamp or the like may be used as the informing device.

If all of the outboard motors 1 are in the propulsive force non-operable state, i.e., the engines 11 of all of the outboard motors 1 are off, in the joystick mode (YES in Step S5), the watercraft maneuvering controller 50 switches the control mode to the ordinary mode (Step S6). In this case, the user operates the all-switch 42, 42S to restart the engines 11 of all of the outboard motors 1, or selectively operates the separate switches 43 to restart the engine 11 of at least one of the outboard motors 1 in order to perform the watercraft maneuvering operation. In the present preferred embodiment, the substation SS does not have the separate switches, so that the user operates the all-switch 42S. In the main station MS, the user is able to selectively operate the all-switch 42 and the separate switches 43. Immediately after the engines 11 of the outboard motors 1 are restarted, the control mode is the ordinary mode as the default control mode.

If not all of the outboard motors 1 are in the propulsive force non-operable state in the joystick mode (NO in Step S5), a process sequence from Step S1 is repeated.

There is a possibility that the engines 11 of all of the outboard motors 1 are restored to the propulsive force operable state in the second joystick mode. Specifically, this corresponds to a case such that any of the engines 11 of the outboard motors 1 are instantaneously stopped and restarted. The engines 11 of the outboard motors 1 in the non-operation state may be individually restarted by operating the corresponding separate switches 43 in the main station MS such that all of the outboard motors 1 are restored to the propulsive force operable state. Further, the system may be designed so as to restart the outboard motors 1 in response to the operation of the all-switch 42S of the substation SS in the second joystick mode.

When the engines 11 of all of the outboard motors 1 are thus restored to the operation state in the second joystick mode, the results of the determination in Steps S1 and S7 are positive. Then, the watercraft maneuvering controller 50 determines whether a restoration condition for the restoration to the first joystick mode is satisfied (Step S8). Specifically, the restoration condition includes a condition that the joystick 36S is in the propulsive force generation non-commanding state, i.e., the joystick 36S is not substantially inclined anteroposteriorly. More specifically, the restoration condition may include a condition that the joystick 36S is in the non-operation state, i.e., neither the inclining operation nor the twisting operation are performed. The provision of the restoration condition is preferred because a change in the hull behavior is able to be reduced or prevented during the operation of the joystick 36S. If the restoration condition is satisfied (YES in Step S8), the watercraft maneuvering controller 50 switches the control mode from the second joystick mode to the first joystick mode (Step S3). If the restoration condition is not satisfied (NO in Step S8), the watercraft maneuvering controller 50 maintains the second joystick mode (Step S4).

The watercraft maneuvering controller 50 does not switch the control mode to the joystick mode unless at least one of the outboard motors 1 is in the propulsive force operable state according to the joystick mode switching condition described above. Therefore, at least one of the outboard motors 1 is in the propulsive force operable state immediately after the control mode is switched to the joystick mode.

In the present preferred embodiment, as described above, the watercraft maneuvering system 102 includes the plurality of watercraft maneuvering stations ST, and the watercraft maneuvering stations ST include the first main station MS1, the second main station MS2, and the substation SS. The main stations MS each include the steering wheel 31 and the acceleration levers 33 to adjust the propulsive force. The substation SS is spaced apart from the main station MS, and includes the joystick 36S provided alone as the operation element to steer and adjust the propulsive force. Therefore, the substation SS is provided in a relatively small space on the watercraft as compared with the main station MS. Therefore, the substation SS is provided in addition to the main station MS on the relatively small watercraft 100. Further, a watercraft maneuvering station can be additionally provided on a relatively large watercraft without taking up much space on the watercraft. Thus, the watercraft maneuvering system 102 is conveniently provided on the watercraft.

The watercraft maneuvering controller 50 performs the station management operation to select only one of the watercraft maneuvering stations ST as the operative station in which the operation to steer and adjust the propulsive force is enabled. The joystick unit 35S provided in the substation SS includes the joystick button 37S to be operated by the user in order to enable the operation input with the joystick 36S. When the joystick button 37S is operated, the watercraft maneuvering controller 50 selects the substation SS as the operative station. Therefore, the operation input with the joystick 36S of the substation SS is enabled by operating the joystick button 37S in the substation SS. Thus, the user is able to switch the operative station from the main station MS to the substation SS by the simple operation to perform the watercraft maneuvering operation with the use of the joystick 36S in the substation SS. Therefore, the user is able to start the watercraft maneuvering operation in the substation SS without the need to return to the main station MS.

When the joystick button 37S is operated in the substation SS, the watercraft maneuvering controller 50 determines whether the substation switching condition is satisfied. If it is determined that the substation switching condition is satisfied, the watercraft maneuvering controller 50 selects the substation SS as the operative station. Thus, the operative station is properly switched from the main station MS to the substation SS. Therefore, the watercraft maneuvering system is highly convenient, while allowing smooth switching to the substation SS. Particularly, when the substation switching condition is such that at least one of the propulsion systems (outboard motors 1) provided in the watercraft 100 including the watercraft maneuvering system 102 is in the propulsive force operable state, the operative station is able to be switched to the substation SS in the propulsive force available state. Therefore, the user is able to perform the watercraft maneuvering operation using the propulsive force by operating the joystick 36S in the substation SS.

The station changing button 34 to be operated by the user in order to enable the watercraft maneuvering operation by the main station MS is provided in the remote control unit 32 provided in the main station MS. When the station changing button 34 is operated, the watercraft maneuvering controller 50 determines whether the main station switching condition is satisfied. If it is determined that the main station switching condition is satisfied, the watercraft maneuvering controller 50 selects the main station MS as the operative station. Therefore, the user is able to perform the watercraft maneuvering operation with the use of the steering wheel 31 and the acceleration levers 33 in the main station MS. The operative station is switched to the main station MS on condition that the main station switching condition is satisfied. Therefore, the watercraft maneuvering system 102 is highly convenient, while allowing smooth switching to the main station MS.

The watercraft maneuvering controller 50 further performs the mode management operation to manage the control mode of the propulsion systems (outboard motors 1). The watercraft maneuvering controller 50 sets the control mode to the joystick mode when selecting the substation SS as the operative station. If it is further necessary to perform an operation to change the control mode from the ordinary mode to the joystick mode when the operative station is switched to the substation SS by the operation of the joystick button 37S, a prolonged procedure would be required before the watercraft maneuvering operation is performed with the use of the joystick 36S in the substation SS. In the present preferred embodiment, in contrast, the watercraft maneuvering controller 50 sets the control mode to the joystick mode simultaneously with the switching of the operative station to the substation SS in response to the operation of the joystick button 37S. Since the procedure required before starting the watercraft maneuvering operation with the use of the joystick 36S in the substation SS is shortened, the watercraft maneuvering system 102 is more convenient. The joystick 36S is provided alone as the operation element to steer and adjust the propulsive force in the substation SS and, therefore, the automatic switching of the control mode is practical.

When the main station MS is selected as the operative station in response to the operation of the station changing button 34 of the main station MS, the watercraft maneuvering controller 50 sets the control mode to the ordinary mode. Thus, the watercraft maneuvering operation is performed with the use of the steering wheel 31 and the acceleration levers 33 of the main station MS without the need for an operation to switch to the ordinary mode. Therefore, the watercraft maneuvering system is still more convenient.

When the joystick 36 is provided in the main station MS, the user may desire to perform the watercraft maneuvering operation with the use of the joystick 36, not with the use of the steering wheel 31 and the acceleration levers 33, after the operative station is switched to the main station MS. In the main station MS, however, the watercraft maneuvering operation is generally performed with the use of the steering wheel 31 and the acceleration levers 33, so that it is appropriate to set the ordinary mode as the default control mode. When the control mode is the ordinary mode (default control mode) immediately after the operative station is switched to the main station MS, the user is able to easily recognize the control mode. Therefore, this arrangement is preferable.

The substation SS in which the joystick 36S is provided alone as the operation element to steer and adjust the propulsive force is free from the concern described above. Since the control mode is the joystick mode when the operative station is the substation SS, the user need not be conscious of the control mode.

In the present preferred embodiment, the joystick unit 35 is provided in the main station MS, and the watercraft maneuvering operation is also performed with the use of the joystick 36 in the main station MS. If the operative station is the main station MS in the joystick mode, the watercraft maneuvering controller 50 controls the propulsion systems (outboard motors 1) in response to the operation of the joystick 36 of the main station MS. If the operative station is the substation SS in the joystick mode, on the other hand, the watercraft maneuvering controller 50 controls the propulsion systems (outboard motors 1) in response to the operation of the joystick 36S of the substation SS.

In the present preferred embodiment, the joystick mode includes the first joystick mode in which the propulsive forces of the respective propulsion systems (outboard motors 1) are used, and the second joystick mode in which the propulsive force of one propulsive force operable propulsion system (outboard motor 1) is used. When the control mode is set to the joystick mode, the watercraft maneuvering controller 50 determines whether or not all of the propulsion systems (outboard motors 1) with their propulsive forces to be used in the first joystick mode are in the propulsive force operable state. If this determination result is positive, the watercraft maneuvering controller 50 sets the control mode to the first joystick mode. If not all of the propulsion systems (outboard motors 1) with their propulsive forces to be used in the first joystick mode are in the propulsive force operable states, the watercraft maneuvering controller 50 sets the control mode to the second joystick mode. Since the joystick mode is properly selected according to the states of the propulsion systems (outboard motors 1), the propulsion systems (outboard motors 1) are properly controlled according to the operation of the joystick 36.

If not all of the propulsion systems (outboard motors 1) with their propulsive forces to be used in the first joystick mode are in the propulsive force operable state but the control mode is set to the first joystick mode, the watercraft maneuvering controller 50 uselessly controls a propulsive force non-operable propulsion system (outboard motor 1). In addition, the propulsive force non-operable propulsion system (outboard motor 1) cannot respond to the control command from the watercraft maneuvering controller 50, thus failing to achieve an intended hull behavior. When the control mode is set to the second joystick mode in which the propulsive force of the propulsive force generating propulsion system (outboard motor 1) is used, in contrast, the watercraft maneuvering controller 50 is able to achieve the intended hull behavior according to the operation of the joystick 36 without uselessly performing the control operation.

In a preferred embodiment described above, the second joystick mode is enabled only when the operative station is the substation SS, but the second joystick mode may be enabled when the operative station is the main station MS.

While preferred embodiments of the present invention have thus been described, the present invention may be embodied in other ways as will be described below by way of example.

In a preferred embodiment described above, the outboard motors 1 each including the engine as a prime mover are used as the propulsion systems, but propulsion systems of different structure may be used. For example, electric propulsion systems each including an electric motor as the prime mover may be used as the propulsion systems. Besides the outboard motors 1, the propulsion systems may be inboard motors, inboard/outboard motors, jet propulsion systems, or any other types of propulsion systems.

In a preferred embodiment described above, the state such that the engines 11 of the outboard motors 1 are in operation is defined as the propulsive force operable state, and the state such that the engines 11 are stopped is defined as the propulsive force non-operable state by way of example. The propulsive force operable state should be regarded as a state such that the propulsive force is able to be generated in response to the operation of the operation element to adjust the propulsive force, specifically, the operation of the joystick 36, 36S or the acceleration levers 33. In the case of the electric propulsion systems, the propulsive force operable state refers to a state such that the electric motor is energized by the operation of the joystick 36, 36S or the acceleration levers 33 to generate power.

In a preferred embodiment described above, the two propulsion systems (two outboard motors 1) are provided on the stern 2 by way of example, but the number and the positions of the propulsion systems are not limited to those. Three or more propulsion systems may be provided on the stern 2. Further, a bow thruster may be provided around the bow.

In the example described above, the propulsive forces of all of the propulsion systems (outboard motors 1) provided in the watercraft 100 are used in the first joystick mode. However, where two propulsion systems are provided on the stern 2 and an auxiliary propulsion system such as a bow thruster is additionally provided, for example, the first joystick mode may be a control mode such that the propulsive forces of the two propulsion systems are used and the propulsive force of the auxiliary propulsion system is not used. Where three propulsion systems are provided on the stern 2, the propulsive forces of all of the propulsion systems may be used, or the propulsive forces of some of the propulsion systems (e.g., two of the propulsion systems) may be used in the first joystick mode.

In the example described above, the propulsive force of one of the propulsion systems is used in the second joystick mode. However, where three propulsion systems are provided on the stern 2, for example, the propulsive forces of all of the propulsion systems may be used in the first joystick mode, and the propulsive force of not all of the propulsion systems (e.g., one or two of the propulsion systems) may be used in the second joystick mode. Alternatively, the propulsive forces of two or three of the propulsion systems provided on the stern 2 may be used in the first joystick mode, and the propulsive forces of at least one propulsive force operable propulsion system provided on the stern 2 and an auxiliary propulsion system (such as a bow thruster) may be used in the second joystick mode. Further, the joystick mode may include three or more selectable joystick modes. Specifically, the selectable joystick modes include a first joystick mode in which the propulsive forces of the three propulsion systems are used, a second joystick mode in which the propulsive forces of two of the propulsion systems are used, and a third joystick mode in which the propulsive force of one of the propulsion systems is used.

In a preferred embodiment described above, the two main stations MS and the single substation SS are provided by way of example. However, the number of main stations MS and the number of substations SS are not limited to those described above. A single main station MS or three or more main stations MS may be provided, and two or more substations SS may be provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A watercraft maneuvering system comprising:
a plurality of watercraft maneuvering stations to steer and adjust a propulsive force of a watercraft, the plurality of watercraft maneuvering stations including:
a main station including a steering wheel to steer the watercraft and an acceleration lever to adjust the propulsive force; and
a substation spaced apart from the main station and including a joystick to both steer the watercraft and adjust the propulsive force; and
a controller configured or programmed to perform a station management operation to select only one of the plurality of watercraft maneuvering stations as an operative station in which an operation to steer and adjust the propulsive force is enabled; wherein
the substation includes a joystick button operable by a user to enable an operation input with the joystick;
the controller is configured or programmed to select the substation as the operative station in response to the operation of the joystick button;
the controller is configured or programmed to perform a mode management operation to manage a propulsion system control mode;
the control mode includes an ordinary mode in which the operation of the joystick is disabled, and a joystick mode in which the operation of the joystick is enabled; and
the controller is configured or programmed to set the control mode to the joystick mode when the substation is selected as the operative station;
the joystick mode includes a first joystick mode in which propulsive forces of a plurality of propulsion systems are used, and a second joystick mode in which a propulsive force of a propulsive force of less than all propulsion systems is used; and
when the control mode is set to the joystick mode, the controller is configured or programmed to determine whether the plurality of propulsion systems are in a propulsive force operable state and, when all of the plurality of propulsion systems are in the propulsive force operable state, the controller is configured or programmed to set the control mode to the first joystick mode and, when not all of the plurality of propulsion systems are in the propulsive force operable state, the controller is configured or programmed to set the control mode to the second joystick mode.

2. The watercraft maneuvering system according to claim 1, wherein
the controller is configured or programmed to determine, in response to the operation of the joystick button, whether a predetermined substation switching condition is satisfied and, when it is determined that the substation switching condition is satisfied, the controller is configured or programmed to select the substation as the operative station;
the substation switching condition includes at least one selected from the group consisting of:
a condition that an operation state of a current operative station is a propulsive force generation non-commanding state;
a condition that an operation state of the joystick of the substation is the propulsive force generation non-commanding state; and
a condition that at least one of propulsion systems provided in a watercraft including the watercraft maneuvering system is in a propulsive force operable state.

3. The watercraft maneuvering system according to claim 1, wherein
the main station includes a joystick; and
the joystick mode is a control mode which responds to operation of either of the joystick of the main station when the main station is the operative station, or the joystick of the substation when the substation is the operative station.

4. A watercraft comprising:
a hull; and
a watercraft maneuvering system according to claim 1 provided in the hull.

5. The watercraft maneuvering system according to claim 1, wherein
the main station includes a station changing button operable by the user to enable a watercraft maneuvering operation in the main station;
the controller is configured or programmed to determine, in response to the operation of the station changing button, whether a predetermined main station switching condition is satisfied and, when it is determined that the main station switching condition is satisfied, the controller is configured or programmed to select the main station as the operative station;
the main station switching condition includes at least one selected from the group consisting of:
a condition that an operation state of a current operative station is a propulsive force generation non-commanding state; and
a condition that an operation state of the main station as a switching destination is the propulsive force generation non-commanding state.

6. The watercraft maneuvering system according to claim 5, wherein
in the ordinary mode, operation of the steering wheel and the acceleration lever is enabled; and
the controller is configured or programmed to set the control mode to the ordinary mode when the main station is selected as the operative station in response to the operation of the station changing button of the main station.

7. The watercraft maneuvering system according to claim 1, wherein
the first joystick mode is a control mode in which the plurality of propulsion systems are controlled so as to achieve a predetermined hull behavior using the propulsive forces of the plurality of propulsion systems according to a predetermined operation of the joystick; and
the second joystick mode is a control mode in which the predetermined hull behavior is disabled.

8. The watercraft maneuvering system according to claim 7, wherein the predetermined hull behavior includes at least one selected from the group consisting of a translating behavior to translate a hull substantially without turning a bow of the hull, and a fixed-point bow-turning behavior to turn the bow of the hull substantially without changing a position of the hull.

9. A watercraft maneuvering system comprising:
a plurality of propulsion systems;
a joystick; and
a controller configured or programmed to include, as a control mode to control the propulsion systems, a joystick mode in which the propulsion systems are controlled according to an operation of the joystick; wherein
the joystick mode includes a first joystick mode in which propulsive forces of the plurality of propulsion systems are used, and a second joystick mode in which a propulsive force of less than all propulsion systems is used;
when the control mode is set to the joystick mode, the controller is configured or programmed to determine whether the plurality of propulsion systems are in a propulsive force operable state and, when all of the plurality of propulsion systems are in the propulsive force operable state, the controller is configured or programmed to set the control mode to the first joystick mode and, when not all of the plurality of propulsion systems are in the propulsive force operable state, the controller is configured or programmed to set the control mode to the second joystick mode.

10. A watercraft comprising:
a hull; and
a watercraft maneuvering system according to claim 9 provided in the hull.

11. The watercraft maneuvering system according to claim 9, wherein
the first joystick mode is a control mode in which the plurality of propulsion systems are controlled so as to achieve a predetermined hull behavior using the propulsive forces of the plurality of propulsion systems according to a predetermined operation of the joystick; and
the second joystick mode is a control mode in which the predetermined hull behavior is disabled.

12. The watercraft maneuvering system according to claim 11, wherein the predetermined hull behavior includes at least one selected from the group consisting of a translating behavior to translate a hull substantially without turning a bow of the hull, and a fixed-point bow-turning behavior to turn the bow of the hull substantially without changing a position of the hull.

* * * * *